Aug. 29, 1961

G. S. GILBERT 2,997,788

DISPLAY LID

Filed Jan. 6, 1958

INVENTOR.
GRANT S. GILBERT
BY *Ely, Pearne & Gordon*
ATTORNEYS

United States Patent Office 2,997,788
Patented Aug. 29, 1961

2,997,788
DISPLAY LID
Grant S. Gilbert, Cleveland, Ohio, assignor to Cleveland Cleaner & Paste Company, Cleveland, Ohio, a corporation of Ohio
Filed Jan. 6, 1958, Ser. No. 707,308
1 Claim. (Cl. 30—123)

This invention relates to packaging and specifically to a can lid structure. In its more particular aspects it relates to a cutter and cutter-displaying device embodied in a closure or lid which is to be used with cans or similar containers. The invention is normally employed with containers holding molding compound or natural or artificial clay or other similar materials subject to being worked, rolled and molded or cut into desired shape.

Figure 1:
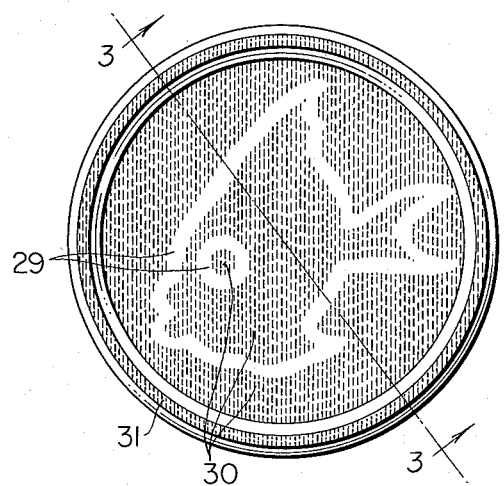
Figure 2:
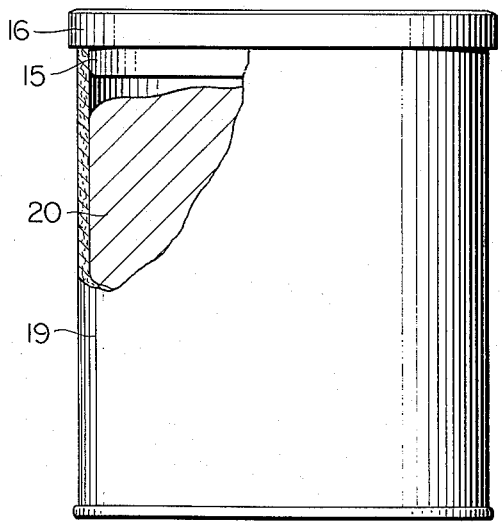
Figure 3:
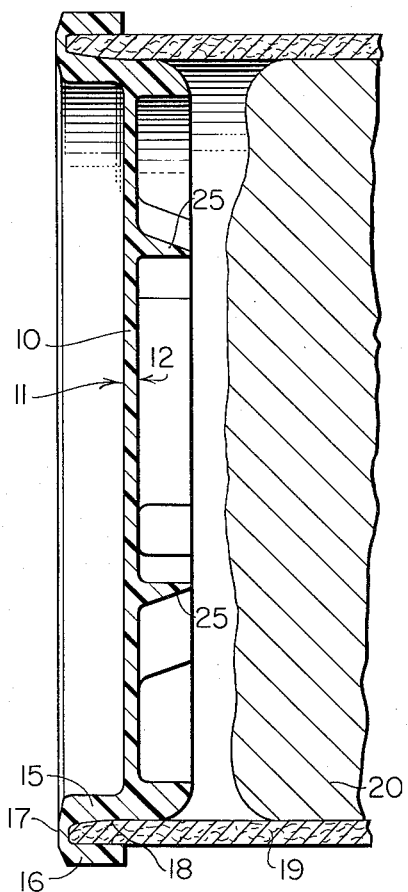

An example of a container lid embodying the invention is described below and illustrated in the accompanying drawings. The lid is shown in association with a paper can. FIGURE 1 is a plan view. FIGURE 2 is an elevational view with the paper can partly broken away. FIGURE 3 is a fragmentary section taken from the plane of line 3—3 in FIGURE 1.

The illustrated structure comprises an integral piece of lucid, flexible plastic, such as polyethylene or the like. In the particular example of the invention, the polyethylene is of a white cast. The structure forms a closure wall 10 having a first face 11 which is the upper or outer face of the lid and an opposite second face 12 which is the lower or inner face of the lid. An inner annular flange 15 extends around the periphery of the closure wall 10. An outer annular flange 16 is concentric with the inner annular flange 15 and is joined thereto in closely spaced relationship therewith as by the relatively thin section 17. The flanges 15 and 16 thereby define a container-rim-receiving annular opening 18 which faces in the same direction as the second face 12. This annular opening may receive the rim mouth or wall of a container, such as the wall 19 of a paper can. The paper can may be filled with molding compound or natural or artificial clay or other similar material subject to being worked, rolled and molded or cut into desired shape, such material being designated by the reference numeral 20.

Projecting from the second face 12 is a cutter flange or flanges 25. The flange 25 is arranged in the outline shape of a symbol or representation, such as the outline of a fish seen in FIGURE 1. The cutter flange 25 is integrally joined to the closure wall, being molded or cast as part of a substantially homogeneous, unitary structure.

By virtue of the shape of the cutter flange 25 and the integral association between this flange and the container wall 10 together with the fact that a lucid plastic material is employed in forming the article, the juncture between the cutter flange and the closure wall presents an area or areas 29 of relatively opaque appearance when viewed from the side of the closure wall identified with the first face 11 or, in other words, when viewed from the outside or top of the container. If the plastic material is of a white cast, the area or areas 29 will have a dead white or light grey appearance. If the plastic is tinted, the area or areas 29 will have a hue of corresponding color or shade. This juncture thus delineates in bold relief the symbol or representation into which the cutter flange is shaped. The effect is particularly stimulating, from a point-of-sale display standpoint, where the color of the material 20 with which the container is filled is discernible through the wall 10 as an area or areas of color 30 which contrast with the area or areas 29. Such discernibility of the color of the material 20 means furthermore that the color of the contents of the container is directly displayed to the purchaser, and this feature in itself is advantageous from the point-of-sale display standpoint.

Due to the relative thinness of the section 17 and the opacity of the rim of the wall 19 which is located directly under the section 17, a darkened rim area 31 may appear when the lid is viewed from the top side.

The illustrated example of the invention will suggest variations to those concerned with the packaging and display designs. Accordingly, the scope of the invention is not to be limited to all the specific details of the illustrated example but is to be defined by the following claim.

What is claimed is:

A combined closure and display cutter of unitary construction comprising an integral piece of lucid plastic formed as a closed closure wall having a first face and an opposite second face, an inner annular flange extending around the periphery of said closure wall, an outer annular flange concentric with the inner flange and joined thereto in closely spaced relation therewith and thereby defining a container-rim-receiving annular opening, a cutter flange projecting from said second face and extending in a closed path to define the outline shape of a symbol or representation, said cutter flange being integrally joined to said closure wall, the juncture between said cutter flange and said closure wall presenting an area of relatively opaque appearance when viewed from either side of said closure wall, said inner annular flange being deeper than said outer annular flange, the juncture of said inner and outer flanges defining a first bounding plane, the free edge of the inner annular flange defining a second bounding plane, said cutter flange lying entirely within the zone between said first and second bounding planes, the innermost of said first and second faces of said closure wall being inset from said second bounding plane, the outermost of said first and second faces of said closure wall being inset from said first bounding plane, whereby when said device is combined in covering relationship with a container, said area of relatively opaque appearance displays the outline shape of said symbol or representation.

References Cited in the file of this patent
UNITED STATES PATENTS

| | | |
|---|---|---|
| 1,100,489 | Palmer | June 16, 1914 |
| 2,638,261 | Poole | May 12, 1953 |
| 2,726,517 | Pruett | Dec. 13, 1955 |
| 2,729,328 | Rossem | Jan. 3, 1956 |